US010949746B2

United States Patent
Haruki et al.

(10) Patent No.: US 10,949,746 B2
(45) Date of Patent: Mar. 16, 2021

(54) EFFICIENT PARALLEL TRAINING OF A NETWORK MODEL ON MULTIPLE GRAPHICS PROCESSING UNITS

(71) Applicant: International Business Machines Corporation, Armonk, NY (US)

(72) Inventors: Imai Haruki, Yokohama (JP); Tung Duc Le, Ichikawa (JP); Yasushi Negishi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 960 days.

(21) Appl. No.: 15/423,900

(22) Filed: Feb. 3, 2017

(65) Prior Publication Data

US 2018/0121806 A1    May 3, 2018

Related U.S. Application Data (60) Provisional application No. 62/413,695, filed on Oct. 27, 2016.

(51) Int. Cl.
*G06N 3/08* (2006.01)
*G06N 3/04* (2006.01)

(52) U.S. Cl.
CPC ........... *G06N 3/084* (2013.01); *G06N 3/0454* (2013.01)

(58) Field of Classification Search
CPC ............. G06T 1/20; G06T 2207/20081; G06T 2207/20084; G06T 2210/52; G06N 3/08; G06N 3/084
See application file for complete search history.

(56) References Cited

U.S. PATENT DOCUMENTS 8,239,866 B2    8/2012    Carrie
2016/0321777 A1*   11/2016    Jin .................. G06F 9/5016

FOREIGN PATENT DOCUMENTS

CN        103309889 A     9/2013
WO     WO20150192812 A1    12/2015

OTHER PUBLICATIONS

Cui et al., Scalable deep learning on distributed GPUs with a GPU-specialized parameter server, Carnegie Mellon University PArallel Data Laboratory, Oct. 2015. (Year: 2015).*

(Continued)

*Primary Examiner* — Kamran Afshar
*Assistant Examiner* — Marshall L Werner
(74) *Attorney, Agent, or Firm* — Martin & Associates, LLC; Derek P. Martin (57) ABSTRACT

A system and method provides efficient parallel training of a neural network model on multiple graphics processing units. A training module reduces the time and communication overhead of gradient accumulation and parameter updating of the network model in a neural network by overlapping processes in an advantageous way. In a described embodiment, a training module overlaps backpropagation, gradient transfer and accumulation in a Synchronous Stochastic Gradient Decent algorithm on a convolution neural network. The training module collects gradients of multiple layers during backpropagation of training from a plurality of graphics processing units (GPUs), accumulates the gradients on at least one processor and then delivers the gradients of the layers to the plurality of GPUs during the backpropagation of the training. The whole model parameters can then be updated on the GPUs after receipt of the gradient of the last layer.

17 Claims, 6 Drawing Sheets

(56) References Cited

OTHER PUBLICATIONS

Yadan et al., Multi-GPU Training or ConvNets, Facebook AI Group, Feb. 2014. (Year: 2014).*
Iandola et al., FireCaffe: Near-linear Acceleration of Deep Neural Network Training on Computing Clusters, pp. 1-13, Jan. 2016. (Year: 2016).*
Zhang et al., Poseidon: A System Architecture for Efficient GPU-based Deep Learning on Mlutiple Machines, pp. 1-14, Dec. 2015. (Year: 2015).*
Zhang et al., "Poseidon: A System Architecture for Efficient GPU-based Deep Learning on Multiple Machines", Carnegie Mellon University, Dec. 19, 2015.
Seide et al., "1-Bit STochastic Gradient Descent and its Application to Data-Parallel Distributed Training of Speech DNNs", Interspeech 2014.
Dettmers, Tim, "8-Bit Approximations for Parallelism in Deep Learning", the Faculty of Informatics, Feb. 19, 2016.
Scherer at al., "Accelerating Large-scale Convolutional Neural Networks with Parallel Graphics Multiprocessors", Proceeding of NIPS 2009 Workshop on Large-Scale Machine Learning: Parallelism and Massive Datasets, Dec. 2009.
English Abstract of Chinese patent reference CN103309889, Sep. 18, 2013.
Yin, Jianxiong, "Build GPU Cluster Hardware for Efficiently Accelerating CNN Training", ROSE Rapid-Rich Object Search Lab, 2016.
Woolley, Cliff, "Advanced Topics in CUDA", Nvidia Corporation, 2011.
Microsoft, "Multiple GPUs and machines", edited Dec. 13, 2016.
Mxnet, "Run MXNet on Multiple CPU/GPUs with Data Parallel", 2016.
Theano, "Using multiple GPUs", printed Jan. 31, 2017.
Github, "Multi-GPU support", Sep. 23, 2014.
TensorFlow, "Convolutional Neural Networks", Dec. 20, 2016.
Code posted on github at https://github.ibm.com/E91061/trlcaffe/blob/master/include/caffe/net.hpp, 2016.
Code posted on github at https://github.ibm.com/E91061/trlcaffe/blob/master/include/caffe/parallel.hpp, 2016.
Code posted on github at https://github.ibm.com/E91061/trlcaffe/blob/master/src/caffe/net.cpp, 2016.
Code posted on github at https://github.ibm.com/E91061/trlcaffe/blob/master/src/caffe/parallel.cpp, 2016.
Code posted on github at https://github.ibm.com/E91061/trlcaffe/blob/master/src/caffe/solver.cpp, 2016.
Code posted on github at https://github.ibm.com/E91061/trlcaffe/blob/master/tools/caffe.cpp, 2016.

* cited by examiner

```
Data parallel process for training:
Require: Neural network net; solver sv.
Ensure: Neural network with updated parameters.
1: i ← 0
2: broadcastParameters()
3: while (i < sv.iteration numbers()) do
4:    loss net.forward()
5:    net.backward ()
6:    collectRemainingGradsFromCPU()
7:    sv.updateParameter()
8:    i ← i + 1
9: end while
```

FIG. 6

Backward propagation Process:
Require: L activations of layers; u updated layer
Ensure: Layer gradients are computed
1: grads[L] net.backward(act[L])
2: u ← L − 1
3: for i = L − 1 to 1 do
4:     grads[i] ← net.layers[i].backward(act[i], grads[i + 1])
5:     MemcpyD2HAsync(p grads[i], grads[i], d2h stream)
6:     accGradsCallback(i, d2h stream)
7:     if (u # 0) & (isUpdated(u)) then
8:         MemcpyH2DAsync(grads[u], g grads[u], h2d stream)
9:         u ← u − 1
10:    end if
11: end for

EFFICIENT PARALLEL TRAINING OF A NETWORK MODEL ON MULTIPLE GRAPHICS PROCESSING UNITS

BACKGROUND

1. Technical Field

This disclosure generally relates to computer processing, and more specifically relates to a system and method for efficient parallel training of a neural network model on multiple graphics processing units by overlapping backpropagation and gradient transfer and accumulation.

2. Background Art

Artificial neural networks (ANNs) are computational models inspired by human central nervous systems that are capable of machine learning and pattern recognition. ANNs are usually presented as systems of interconnected "neurons" that can compute values from inputs by feeding information through the network. ANNs generally include sets of adaptive weights, i.e., numerical parameters that are tuned by a learning algorithm. The adaptive weights are, conceptually, connection strengths between "neurons," which are activated during training and prediction.

Once an ANN has been structured for an application, the network may be trained. To start the training process, initial weights are chosen via an educated guess of the user, or even randomly. In supervised training, both the inputs and the desired outputs are provided to the ANN. The ANN then processes the inputs and compares its results against the desired outputs. If the results do not agree, errors can be propagated back through the ANN, causing the ANN to adjust the weights. With increasing amounts of data (i.e., inputs and desired outputs), the ANN refines chosen weights. When the ANN has been adequately trained, the weights can be set, and the ANN can continue to learn and refine the weights while in use.

A convolutional neural network (CNN) is one type of ANN. The CNN is a feed-forward ANN in which the connectivity pattern between its neurons is inspired by the organization of a human visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. Convolutional networks have wide applications in image and video recognition, recommender systems and natural language processing.

BRIEF SUMMARY

A system and method provides efficient parallel training of a neural network model on multiple graphics processing units. A training module reduces the time and communication overhead of gradient accumulation and parameter updating of the network model in a neural network by overlapping backpropagation and communication processes. In a described embodiment, a training module overlaps backpropagation, gradient transfer and accumulation in a Synchronous Stochastic Gradient Descent algorithm on a convolution neural network. The training module collects gradients of multiple layers during backpropagation of training from a plurality of graphics processing units (GPUs), accumulates the gradients on at least one processor and then delivers the gradients of the layers to the plurality of GPUs during the backpropagation of the training. The whole model parameters can then be updated on the GPUs after receipt of the gradient of the last layer.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The disclosure and claims herein relate to a system and method for efficient parallel training of a neural network model on multiple graphics processing units. A training module reduces the time and communication overhead of gradient accumulation and parameter updating of the network model in a neural network by overlapping backpropagation and communication processes. In a described embodiment, a training module overlaps backpropagation, gradient transfer and accumulation in a Synchronous Stochastic Gradient Descent algorithm on a convolution neural network. The training module collects gradients of multiple layers during backpropagation of training from a plurality of graphics processing units (GPUs), accumulates the gradients on at least one processor and then delivers the gradients of the layers to the plurality of GPUs during the backpropagation of the training. The whole model parameters can then be updated on the GPUs after receipt of the gradient of the last layer.

Deep learning using a convolutional neural network is an effective tool for solving complex problems in computer vision, speech recognition, and natural language processing. For example, deep learning has been successfully used to recognize objects in digital images. Training a deep neural network means optimizing the network loss function by finding feasible values of learnable parameters called weights and biases. There are many such optimization algorithms known in the prior art. Some algorithms update parameters iteratively. Each iteration generally includes three phases. In the forward phase, the value of the loss function is computed from the starting layer to the ending layer of a network. In the backward phase, the gradients with respect to the learnable parameters is computed in the reverse direction (i.e., from the ending layer to the starting layer). In the update parameter phase, all the parameters are updated using the gradients.

Deep neural networks typically incorporate large models trained on big datasets. Training is often accelerated by using graphics processing units (GPUs) and parallelizing the training with data parallelism. In data parallelism, every GPU has the same complete neural network and trains it with different inputs. Once they have all finished the backward phase, they exchange gradients and a server GPU updates the parameters. The updated parameters are synchronized among the GPUs at the beginning of the next training iteration to ensure that all GPUs use the same parameters for training. In the prior art, data parallelism does not scale well due to communication overhead. The communication overhead is significant, especially when training neural networks having an enormous number of parameters with many GPUs because the greater the number of parameters and the greater the number of GPUs, the greater the number of gradients to be exchanged among GPUs.

The training module described herein introduces a novel approach to scaling data parallelism. As described herein, gradients are collected and accumulated on CPUs layer-by-layer during the backward phase. The use of CPUs enables the power of advanced processors to be used to accelerate training by overlapping most of the communication overhead in the data parallelism behind the backward phase of training. This is particularly effective for convolutional neural networks. The layers in convolutional neural networks usually start with convolutional layers having a small number of parameters and end with fully connected layers having a large number of parameters. Since backward computations are performed from the ending layer to the starting layer, collection and accumulation of the gradients of the ending layers will have been completed by the end of the backward phase even though they take much time; furthermore, since collecting and accumulating the gradients of starting layers takes less time, they will be completed immediately after the backward phase with a very low overhead.

As used herein, the term "layer" is used as known in the art of neural networks. A layer takes one or more binary large objects (blobs) as input and returns one or more blobs as output. Blobs are used to hold data such as a batch of images, model parameters, and derivations for optimization. Input blobs are called bottom blobs and output blobs are called top blobs. In processing a layer, there are three important routines: setup, forward, and backward. Setup is used to initialize the layer and its connections once the model is initialized. Forward is used to compute top blobs from bottom blobs. Backward is used to compute the gradient with respect to the bottom input given the gradient with respect to the top output. If a layer has learnable parameters, the gradient with respect to the parameters is computed and stored internally in order to update the parameters. A blob is a multi-dimensional array used as a data structure to provide seamless synchronization capability between the CPUs and the GPUs. It serves as a unified memory interface for storing data as well as communicating between them. Internally, memory allocation and synchronization are managed by a synced memory class template that hides the synchronization details and minimizes data transfer.

Figure 1:
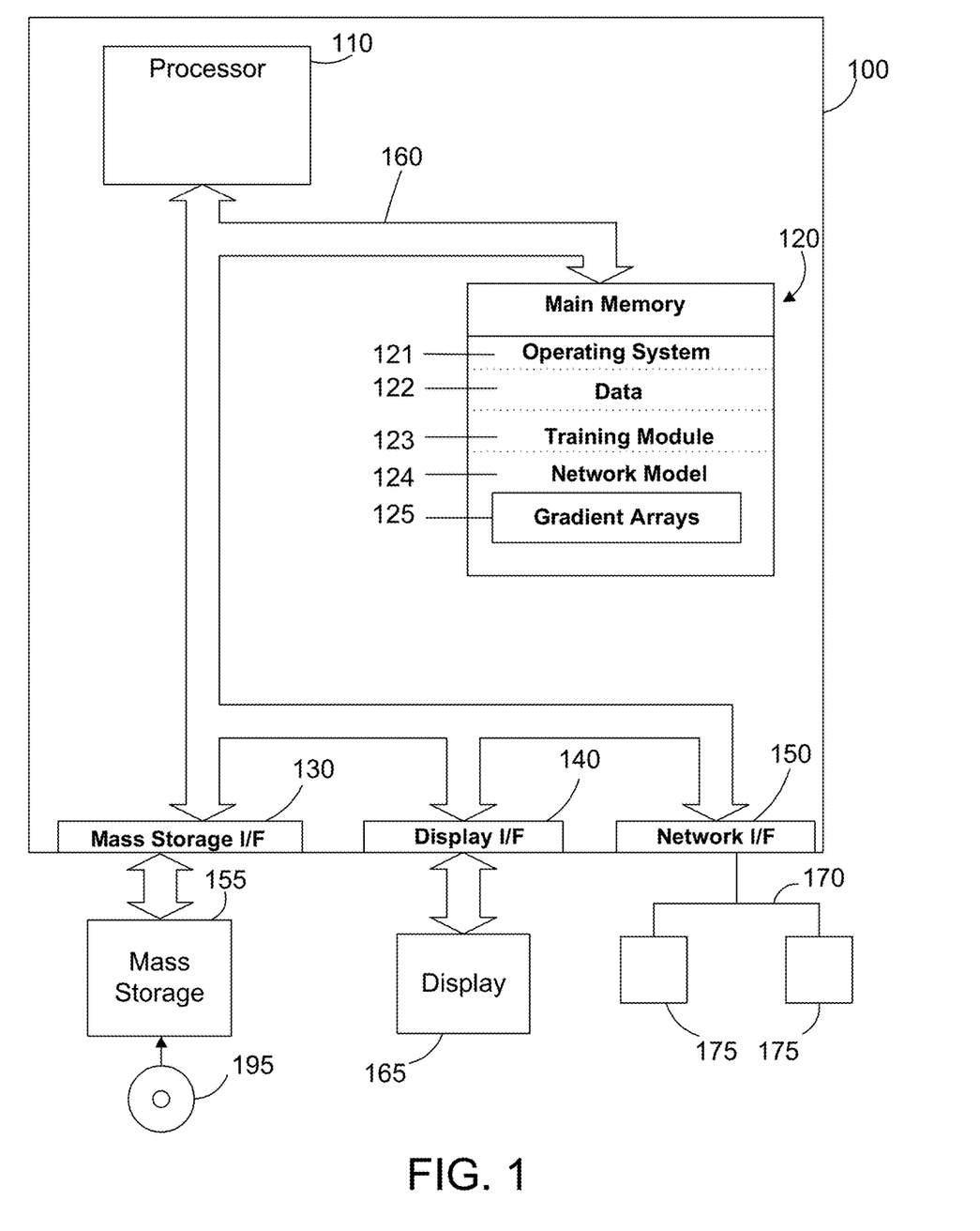
FIG. 1 is a block diagram of a computer system with a training module for efficient parallel training of a neural network model.

Referring to FIG. 1, a computer system 100 is one suitable implementation of a computer system that is capable of performing the computer operations described herein including a training module for efficient parallel training of a neural network model as described herein. Computer system 100 is a computer which can run multiple operating systems including the IBM i operating system. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110. The computer system 100 further includes a main memory 120, a mass storage interface 130, a display interface 140, and a network interface 150. These system components are interconnected through the use of a system bus 160. Mass storage interface 130 is used to connect mass storage devices with a computer readable medium, such as mass storage devices 155, to computer system 100. One specific type of mass storage device 155 is a readable and writable CD-RW drive, which may store data to and read data from a CD-RW 195. Some devices may have a removable memory card or similar for a direct access storage device 155 instead of the CD-RW drive.

Main memory 120 preferably contains an operating system 121. Operating system 121 is a multitasking operating system known in the industry as IBM i; however, those skilled in the art will appreciate that the spirit and scope of this disclosure is not limited to any one operating system. The memory 120 further includes data 122, and a training module 123. The memory 120 also includes a network model 124 with gradient arrays 125 that are created and modified by the training module 123 as described below.

Computer system 100 utilizes well known virtual addressing mechanisms that allow the programs of computer system 100 to behave as if they only have access to a large, single storage entity instead of access to multiple, smaller storage entities such as main memory 120 and mass storage 155. Therefore, while operating system 121, data 122, training module 123, network model 124 and gradient array 125 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the training module 123 for efficient parallel training of a neural network model as described herein.

Although computer system 100 is shown to contain only a single processor and a single system bus, those skilled in the art will appreciate that the system may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
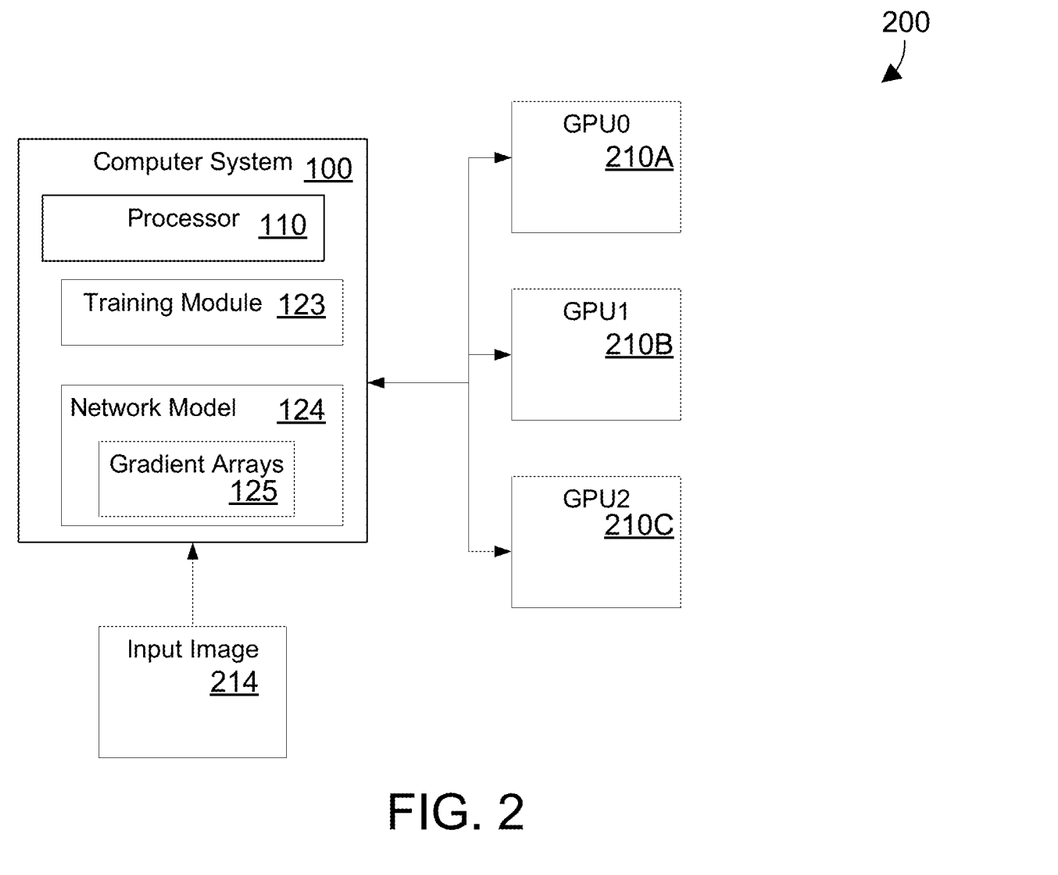
FIG. 2 illustrates simplified block diagram of a system for parallel training of a neural network model.

FIG. 2 illustrates an example of a simplified block diagram of a system 200 for parallel training of a neural network model. The system 200 includes a computer system 100 as described in FIG. 1. The computer system 100 or host computer includes one or more processors 110 and a memory 120 with a training module 123. The computer system 100 further includes a network model 124 with gradient arrays 125 that are created and modified by the training module 123. The computer system 100 has one or more processors as described above coupled to one or more graphics processing units (GPUs) 210. In this example, the computer system 100 is coupled to three GPUs 210A, 210B, 210C. The GPUs 210 may reside on the same motherboard as the computer system processor(s) 110. Alternatively, the GPUs 210 may reside elsewhere and be coupled to the host 100 with a high speed communication link as known in the art. The network model 124 is trained using an input such as input image 214. Training of the network model 124 is similar to the prior art training of neural network models except as described herein.

Figure 3:
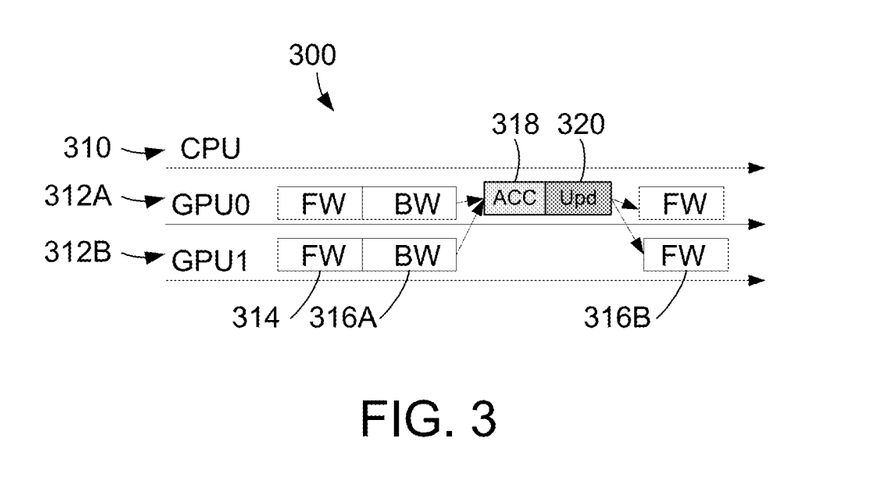
FIG. 3 illustrates a flow diagram for training a neural network model.

FIG. 3 illustrates a timeline diagram 300 for one specific method for training a neural network model. FIG. 3 represents a timeline for actions taken on the computer processor (CPU 310) and two graphics processing units (GPU0 312A and GPU1 312B). As described above, training the neural network model typically includes three basic steps. These steps include forward computation 314, backward computation 316A, and parameter updating. In the forward computation, each GPU calculates a loss value of the model. In the backward computation, referred to herein as backpropagation, the GPUs each calculate gradients with respect to model parameters by allowing information from the cost (the loss value) to flow backward through the network model. The backpropagation operation typically uses a Synchronous Stochastic Gradient Descent (SSGD) algorithm. The gradients are collected and summed up by a parameter server such as GPU0 and the server calculates new model parameters to update the model. In this timeline diagram 300, parameter updating is divided into accumulation 318 and updating 320. After the basic three steps, the next iteration of training begins as represented by the next forward step 316B. Gradient accumulation and updating is typically done on one of the GPUs. In this example, gradient accumulation and updating is done on GPU0 312A. Alternatively, the gradient accumulation and updating could be done on CPU 310 in the same timeframe as shown. These alternatives are less desirable since they do not efficiently utilize the CPU and take longer for each iteration to process.

Figure 4:
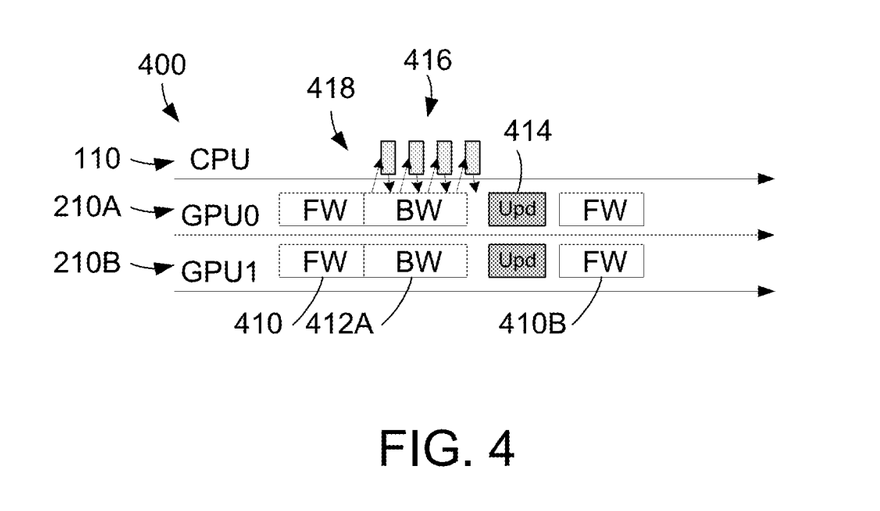
FIG. 4 illustrates a flow diagram for efficient training of a neural network model by overlapping backpropagation and gradient transfer and accumulation as described herein.

FIG. 4 illustrates a timeline diagram 400 for efficient training of a neural network model by overlapping backpropagation and gradient transfer and accumulation as described herein. FIG. 4 represents a timeline for actions taken on the computer processor (CPU 110) and two graphics processing units (GPU0 210A and GPU1 210B). One iteration for training of the network model is represented in FIG. 4. Similar to the example in FIG. 3, the training includes forward computation 410, backward computation or backpropagation 412A, and parameter updating 414. After the basic three steps, the next iteration of training begins as represented by the next forward step 410B. In contrast to the example in FIG. 3, in this timeline diagram 400, parameter accumulation 416 is done on the CPU 110 during the same time as the backpropagation 412A. Overlapping the parameter accumulation to the same time as the backward computation 412A allows the CPU 110 to take some of the burden of processing and reduces the time and communication overhead of gradient accumulation and parameter updating of the network model. The CPU 110 collects the gradients layer-by-layer as they are sent to the CPU 110 during the backpropagation 412A. Once the CPU is finished summing up all the gradients of a layer, it sends the summed gradient of that layer to every GPU. These transfers are overlapped with continued execution on the GPUs of subsequent layers. The multiple boxes 416 represent gradient accumulation of each layer as described further below. The data for the gradient accumulation is sent to the CPU with a data communication stream represented by the arrows 418 to the boxes 416. Typically, each GPU maintains a data communication stream reserved for sending data to the CPU. The data communication stream can be created at the beginning of the training. The stream may be set to a non-block mode so that it does not block other computation streams in the GPU. Each time there is a need to send data to the CPU, this data communication stream can then be used.

Figure 5:
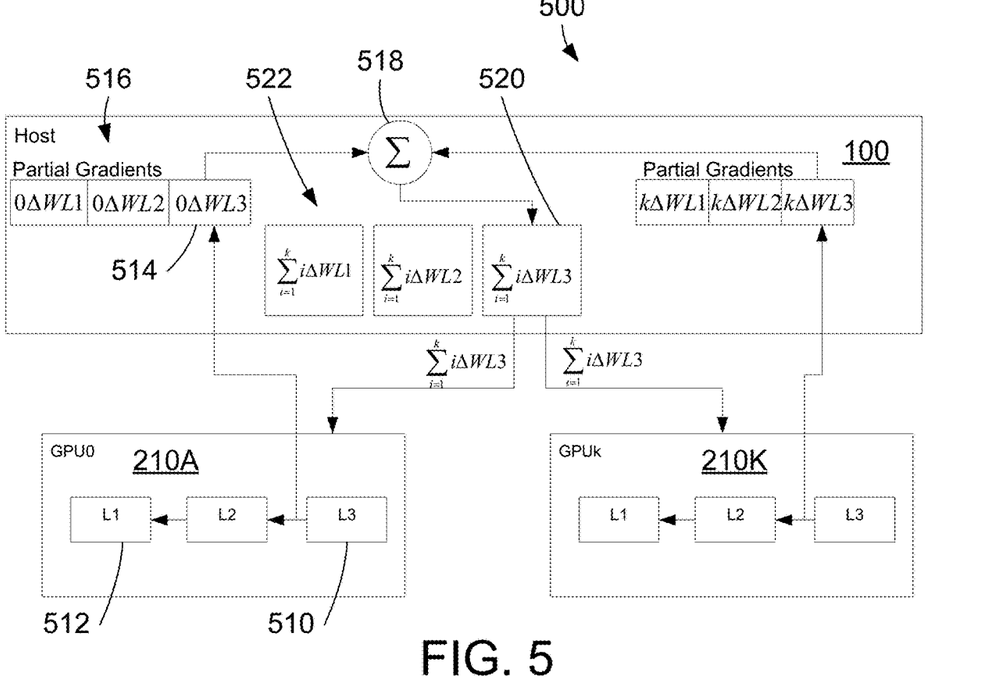
FIG. 5 illustrates a simplified block diagram of the data flow for efficient training of a neural network model by overlapping backpropagation and gradient transfer and accumulation.

FIG. 5 illustrates a simplified block diagram 500 for efficient training of a neural network model by overlapping backpropagation and gradient transfer and accumulation. FIG. 5 shows additional detail concerning the flow of information during backpropagation as introduced in FIG. 4. In FIG. 4, this flow of information was represented by the gradients shown as 4 boxes 416 and the arrows 418 flowing to and from the gradients. The processing described in this section as being performed by the host 100 is preferably done by the training module 123 (FIG. 1 and FIG. 2). The host 100 gathers gradients from one or more connected GPUs 210. In this example, the host is connected to GPU0 210A and GPUk 210K, where k is a variable that represents that any number GPUs could be used. The CPU 110 sums the gradients received from the GPUs and sends the summed gradients to the GPUs as described in more detail below.

Again referring to FIG. 5, each GPU 210 has a number of layers that are processed for the model as known in the prior art. During backpropagation, the layers are processed starting at the higher numbered layer to the first layer as represented by the arrows from layer L3 510 to layer L1 512. After each GPU 210 processes a layer, it sends a partial gradient to the host. For example, GPU0 210A processes layer L3 510 and sends gradient 0ΔWL3 514 to the host. The gradient 0ΔWL3 514 may be stored in a gradient array 516 for storing partial gradients. The host 100 then sums 518 the partial gradients from each GPU210. In the illustrated example, the host 100 sums 518 the partial gradients and sends the summed gradient $$\sum_{i=1}^{k} i\Delta WL3$$

520 to the GPUs 210 as shown. The host 100 may also store the summed gradients 520 in a gradient array 522. The gradient arrays 516 and 522 may comprise the gradient arrays 125 in FIG. 1 and FIG. 2. The summation process 518 done on the CPU proceeds concurrently with the backpropagation as described herein and illustrated in FIG. 4.

Figure 6:
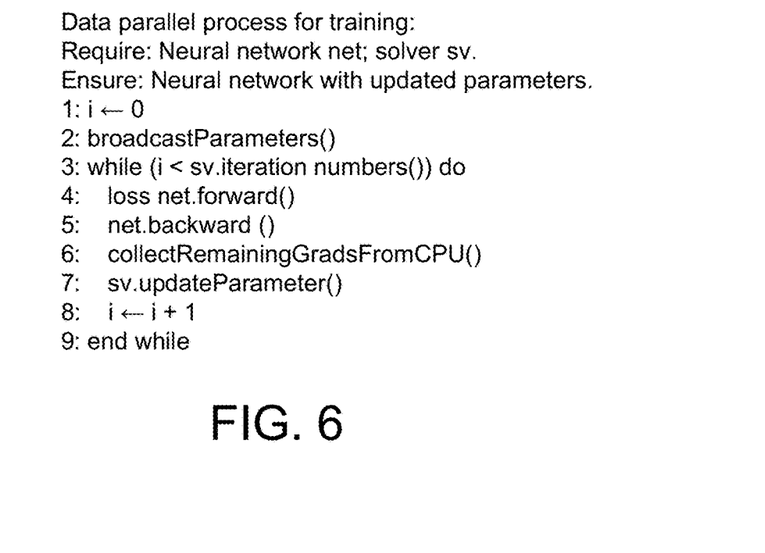
FIG. 6 illustrates a simplified code segment for data parallelism during training of a neural network as described herein.

FIG. 6 illustrates an example simplified code segment for data parallel processing to train a neural network model as described herein. This code segment calls the backpropagation process described below with reference to FIG. 7. First, the GPUs synchronize their learnable parameters (line 2) to ensure that every GPU learns with the same network. For each training iteration, a forward phase computation is done in the usual manner (line 4), and then a backward phase or backpropagation (line 5) is performed. During the backpropagation, the layer output blobs (gradients) are collected and accumulated on the CPUs, overlapping with the backward phase on the GPUs. The gradients accumulated on CPUs are sent back to every GPU, also overlapping with the backward phase. At the end of the backward phase, the remaining updated gradients are collected from the CPUs to the GPUs to ensure that all the gradients are sent to the GPUs (line 6). After receiving the gradients, the GPUs update their own parameters (line 7). Because the GPUs train using the same learnable parameters and update the parameters with the same gradients (received from the CPU), every GPU holds the same learnable parameters after the update, and it can start a new iteration without communicating with other GPUs.

Figure 7:
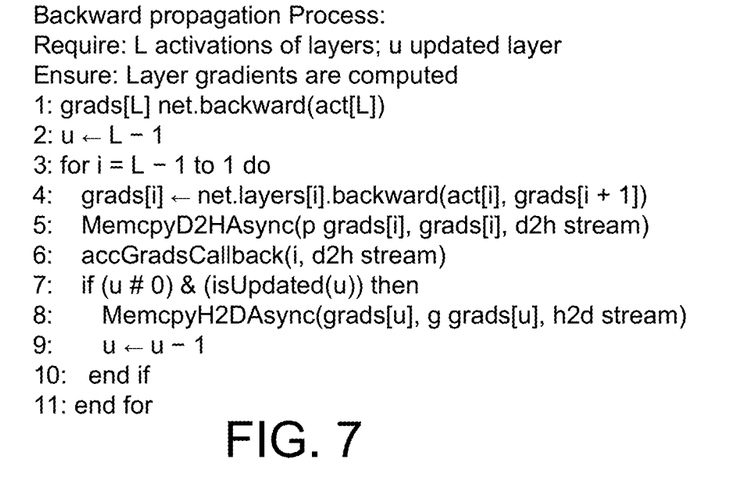
FIG. 7 illustrates a simplified code segment for backpropagation during training of a neural network as described herein.

FIG. 7 illustrates a simplified code segment for backpropagation during training of a neural network as described herein. The backpropagation code collects and accumulates layer gradients during backpropagation. This process is based on the observation that the layer gradients remain unchanged during backpropagation, so there is no need to postpone gradient accumulation until the end. Furthermore, to avoid interrupting the backpropagation on the GPUs, the gradients are sent to the CPU, where they are processed as well. The use of different streams in the GPU programming means that the computations on the CPU and GPUs and the communications between them overlap completely, thereby minimizing the communication overhead in data parallelism. To accumulate the gradients on the CPU, two parallel arrays of blobs need to be maintained on the CPU: one for partial gradients and one for global gradients. On each GPU, there is a blob for partial layer gradients (grads, and there is a copy of it on the CPUs (p grads). The global gradients are used to store the accumulation results over partial gradients from different GPUs. Hence, the blobs for partial gradients and global gradients have the same size. In the process illustrated in FIG. 7, a variable u is used to indicate which layers are the ones for which the partial gradients from all GPUs have been processed (collected and accumulated into the global gradients on the CPU). For example, u=4 means processing for layers L5, L6, . . . , $L_{L-1}$ has been completed. A function Update(u) is used to check whether a layer u has been processed. At the beginning of backpropagation, the variable u is initialized to the top layer, L-1 (line 2).

Again referring to FIG. 7, the backpropagation process proceeds as follows. After backpropagation of layer i on a GPU has been completed (line 4), the partial gradient of the layer is copied from the GPU to the CPUs (line 5), and a callback function on the CPUs is called to accumulate the gradients (line 6). Then, whether layer u has been processed on the CPUs is checked. If it has been processed, each GPU copies the global gradient of u on the CPUs to the partial gradient of u on that GPU and updates u (lines 7-10). The copy from the GPUs to the CPUs and the callback are called with the same communication stream to ensure the correct order between them. Because the copies from the CPUs to the GPUs and from the GPUs to the CPUs are asynchronous and belong to two different streams, they completely overlap, and the next layer's backward computation will start immediately upon completion of the copy calls.

Figure 8:
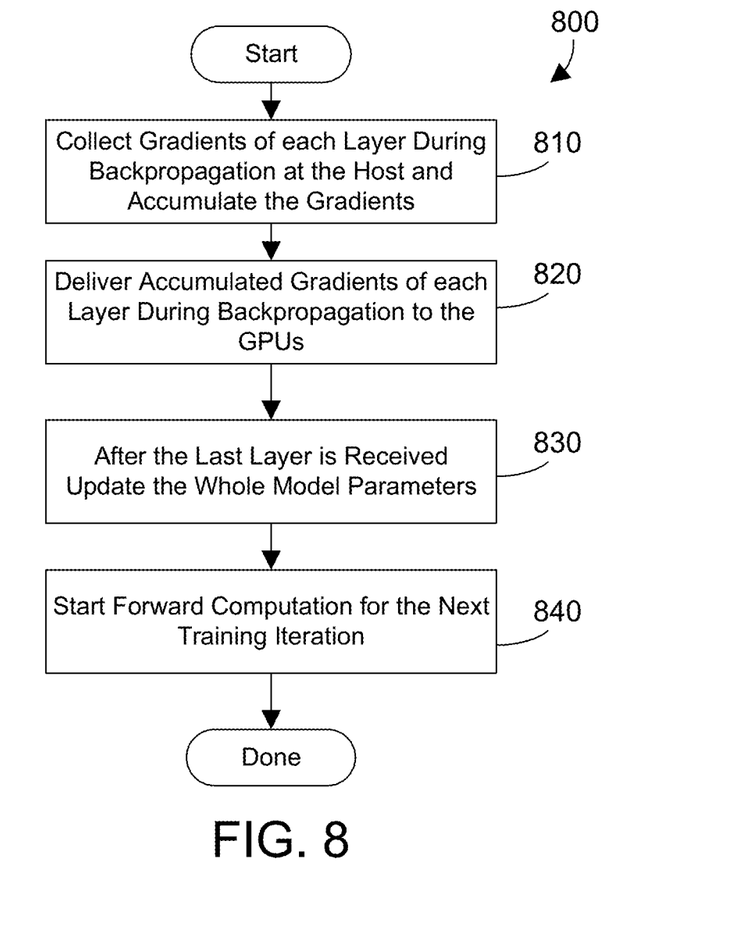
FIG. 8 is a flow diagram of a method for efficient parallel training of a neural network model.

Referring to FIG. 8, a method 800 shows one suitable example for efficient parallel training of a neural network model. Portions of method 800 are preferably performed by the training module 123 executing on the processor 110 shown in FIG. 1. First, collect gradients of each layer during backpropagation at the host and accumulate the gradients (step 810). Next, deliver the accumulated gradients of each layer during backpropagation to the GPUs (step 820). After the last layer is received by the GPUs, update the whole model parameters (step 830). Then start the forward computation for the next training iteration (step 840). Method 800 may then continue with the next iteration until the method is done.

Figure 9:
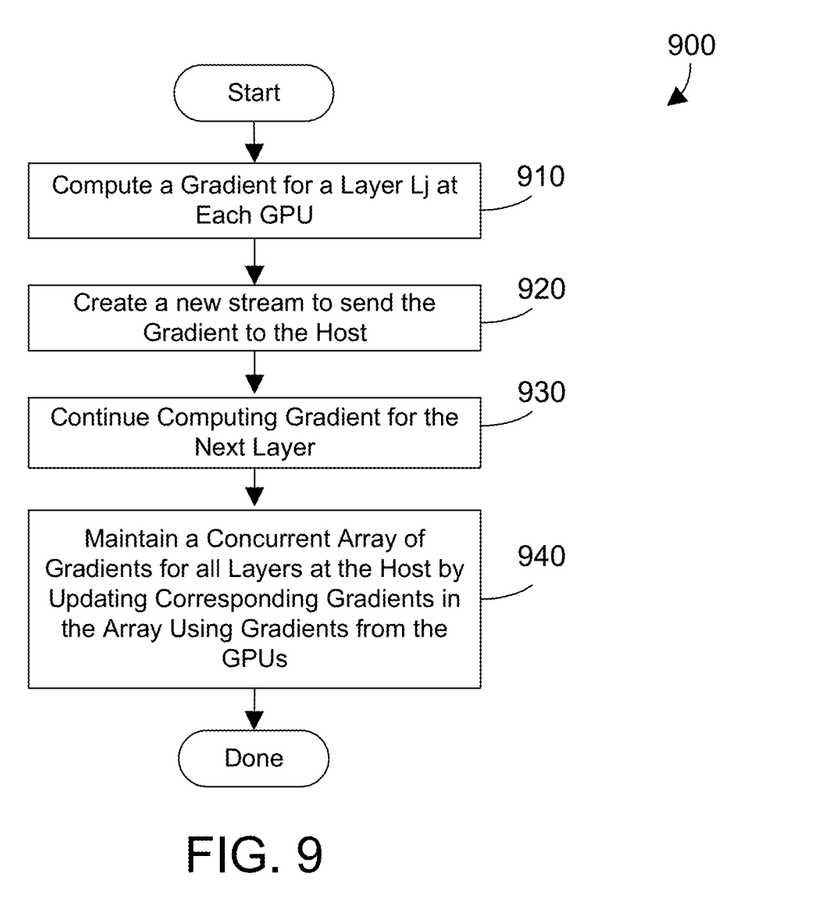
FIG. 9 is a flow diagram to illustrate a suitable example for implementing steps 810 and 820 in FIG. 8.

FIG. 9 shows one suitable example of a method 900 for efficient parallel training of a neural network model. Method 900 thus shows a suitable method for performing step 810 and 820 in method 800. First, compute a gradient for a layer Lj at each GPU (step 910). Create a new data communication stream to send the gradient to the host (step 920). Then continue computing a gradient on the GPUs for the next layer (step 930). Maintain a concurrent array of gradients for all the layers at the host by updating corresponding gradients in the array using gradients from the GPUs (step 940). The method 900 is then done.

The disclosure and claims herein relate to efficient parallel training of a neural network model on multiple graphics processing units to reduce the time and communication overhead of gradient accumulation and parameter updating of the network model by overlapping backpropagation and communication processes. The training module collects gradients of multiple layers during backpropagation of training from a plurality of graphics processing units (GPUs), accumulates the gradients on at least one processor and then delivers the gradients of the layers to the plurality of GPUs during the backpropagation of the training.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:
1. An apparatus comprising:
 a central processing unit (CPU) communicatively coupled to a plurality of graphics processing units (GPUs) and a memory unit;
 a training module residing in the memory unit and executed by the CPU that overlaps backpropagation, gradient transfer and accumulation for each layer of a plurality of layers to train a neural network model by:
collecting gradients of a first layer transferred from the GPUs to the CPU during backpropagation of training;
accumulating the gradients of the first layer on the CPU concurrently during backpropagation; and
delivering the accumulated gradients of the first layer from the CPU to the GPUs concurrently during backpropagation of a second layer on the GPUs after summing up all gradients of the first layer.

2. The apparatus of claim 1 wherein at least one of the GPUs further updates whole model parameters of the neural network model after receipt of a gradient of a last layer.

3. The apparatus of claim 1 wherein the backpropagation is part of a synchronous stochastic gradient descent algorithm for training the neural network model.

4. The apparatus of claim 1 wherein the neural network model is part of a convolutional neural network (CNN).

5. The apparatus of claim 1 further comprising an array in the memory unit coupled to the CPU for storing partial gradients of each layer collected from the GPUs.

6. The apparatus of claim 5 wherein the array further stores accumulated gradients of each layer collected from the GPUs.

7. The apparatus of claim 1 wherein the GPUs transfer gradients of each layer to be collected by the CPU while continuing execution of subsequent layers.

8. The apparatus of claim 1 wherein the GPUs create a communication stream to send the gradients of each layer to a host for accumulation.

9. A computer-implemented method executed by at least one central processing unit (CPU) for training a neural network model comprising:
collecting gradients of each layer of a plurality of layers during backpropagation of training sent from a plurality of graphics processing units (GPUs);
accumulating the gradients of each layer on the CPU concurrently while the GPUs continue backpropagation of a subsequent layer to overlap backpropagation, gradient transfer and accumulation; and
delivering the gradients of each layer during the backpropagation of a subsequent layer from the CPU to GPUs after summing up all gradients of each layer.

10. The method of claim 9 wherein at least one of the GPUs further updates whole model parameters of the neural network model after receipt of a gradient of a last layer.

11. The method of claim 10 wherein after updating the whole model parameters, the GPUs start forward computation for the next training iteration.

12. The method of claim 9 wherein the backpropagation is part of a synchronous stochastic gradient descent algorithm for training the neural network model.

13. The method of claim 9 wherein the neural network model is part of a convolutional neural network (CNN).

14. The method of claim 9 further comprising storing partial gradients of each layer collected from the GPUs in an array in a memory coupled to the CPU.

15. The method of claim 14 wherein the array further stores accumulated gradients of each layer collected from the GPUs.

16. The method of claim 9 further comprising creating a communication stream to send the gradients of each layer to a host for accumulation.

17. A computer-implemented method executed by at least one central processing unit (CPU) for training a neural network model comprising:
collecting gradients of each layer of a plurality of layers during backpropagation of training sent from a plurality of graphics processing units (GPUs);
accumulating the gradients of each layer on the CPU concurrently while the GPUs continue backpropagation execution of subsequent layers to overlap backpropagation, gradient transfer and accumulation;
storing partial gradients of each layer collected from the GPUs in an array in a memory coupled to the CPU and further storing accumulated gradients of each layer collected from the GPUs in the array;
creating a communication stream to send the gradients of each layer to a host for accumulation and delivering the gradients of each layer during the backpropagation from the CPU to GPUs after summing up all gradients of each layer;
wherein at least one of the GPUs further updates whole model parameters of the neural network model after the receipt of a gradient of a last layer; and
wherein the backpropagation is part of a synchronous stochastic gradient descent algorithm for training the neural network model on a convolutional neural network (CNN).

* * * * *